Dec. 2, 1952 — J. O. THORSHEIM — 2,620,414
TEMPERATURE RESPONSIVE CONTROL DEVICE
Filed April 24, 1948 — 2 SHEETS—SHEET 1
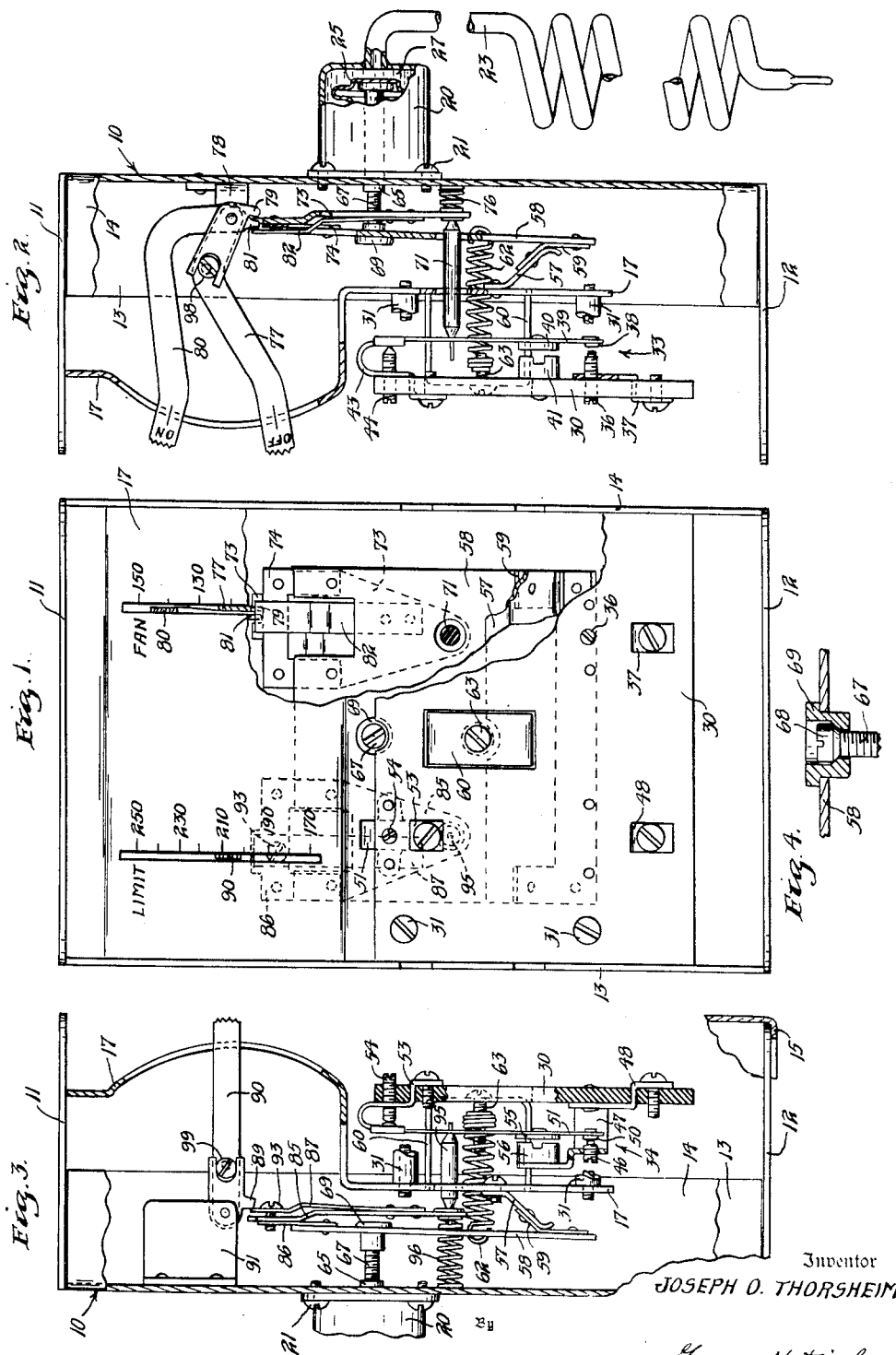
Inventor
JOSEPH O. THORSHEIM
Attorney

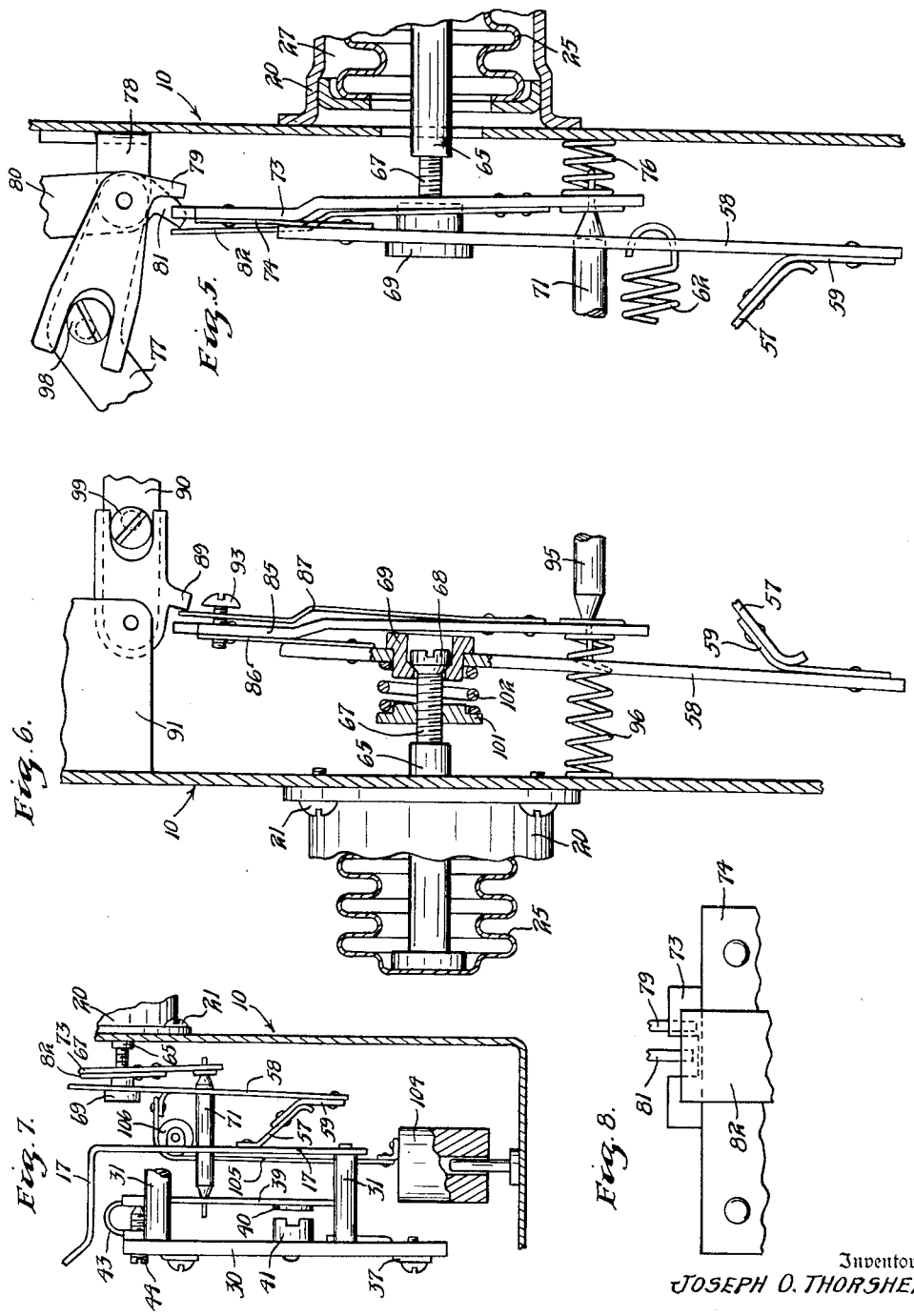

Patented Dec. 2, 1952

2,620,414

UNITED STATES PATENT OFFICE 2,620,414

TEMPERATURE RESPONSIVE CONTROL DEVICE

Joseph O. Thorsheim, Minneapolis, Minn., assignor to Minneapolis-Honeywell Regulator Company, Minneapolis, Minn., a corporation of Delaware Application April 24, 1948, Serial No. 23,027

13 Claims. (Cl. 200—140)

This invention relates to condition responsive control devices and particularly to a structure that will "fail safe."

One of the objects of the invention is to provide a control device having a temperature responsive element that will produce the same control effect if the element is broken or ruptured as is produced by a rise in temperature.

An object, also, is to provide a temperature responsive element utilizing the temperature coefficient of expansion of a liquid and so constructed that a leak in the container for the liquid will result in expansion thereof.

A further object of the invention is to provide a thermostatic control device adapted to stop the supply of heat at a desired high temperature or in the event of rupture of the thermostatic element.

Another object is to provide a condition responsive switching device in which the cut-in and cut-out values of a switch may be independently selected.

Another object is to provide a condition responsive control device employing two switches with provision for independently adjusting the condition values at which one switch is actuated without affecting in any way the value of the condition at which the other switch is operated.

Other objects will be apparent from the following written description of a preferred embodiment of the invention, from the appended claims, and from the drawing, in which Figure 1 is a front view of a combination fan and limit control with the cover removed, and with certain parts broken away;

Figure 2 is an elevation, viewed from the right side of Figure 1, with some parts broken away to show only the fan switch operating mechanism;

Figure 3 is an elevation, viewed from the left side of Figure 1, with some parts broken away to show only the limit switch operating mechanism;

Figure 4 is a fragmentary sectional view of the connection between the temperature responsive element and the switch operating mechanism;

Figure 5 is an enlarged fragmentary view, partly in section showing the fan switch operating mechanism illustrated in Figure 2 in a different operative position;

Figure 6 is a fragmentary view of a modified form of the invention illustrated in connection with the limit switch mechanism;

Figure 7 is a fragmentary view of another modified form of the invention, and

Figure 8 is an enlarged fragmentary view showing in detail the upper end of the fan switch operating lever and its manner of cooperation with the adjusting levers.

The specific embodiment of the invention to be described in detail is a combination fan and limit switch in which a single thermostatic element adapted to be located in the bonnet of a warm air furnace that provides forced circulation of heated air to a space to be heated. In such installations the fire in the furnace is usually controlled by a room thermostat. The fan switch controls the fan motor to circulate air to the space provided the bonnet temperature is sufficiently high. This prevents circulation of cool air to the space which would cause discomfort. The limit switch prevents overheating of the furnace such as might be caused by failure of the fan motor.

The temperature sensing element, which may be located in the bonnet of warm air furnace has a tube connected to a container having a flexible wall, the tube and container constituting a chamber completely filled with a liquid having a greater temperature coefficient of expansion than the insertion tube.

Referring now to the drawings, a frame 10 is formed of sheet metal and has upturned ends 11 and 12 and upturned sides 13 and 14. A portion of a cover 15 is shown in Figure 3. The cover is formed to enclose all the open portions of the frame 10. A subframe 17 is suitably attached to the sides 13 and 14 of the frame 10 and also to the top portion 11. The subframe 17 carries the switching mechanism, to be described, and is also formed towards the upper portion thereof to provide a scale plate for both the fan and limit switch adjusting means.

The thermostatic element, as shown in Figure 2, comprises a cup-shaped container 20 attached by screws 21 to the rear surface of the frame 10. A flexible tube 23 has one end in communication with the interior of the container 20 and the other end closed. The tube 23 may be helically coiled to provide the required interior volume in a suitably small space. A flexible metal bellows 25 has an open end sealed to the periphery of the container 20 adjacent the frame 10 of the device and has a closed end extending toward the closed end of the container 20. The bellows 25 together with the container 20 and the tube 23 provide a sealed chamber that is completely filled with a suitable liquid 27 whose thermal expansion properties are used to cause expansion and contraction of the bellows 25 with changes in temperature. The body of liquid 27 may, for example, be aniline or toluene or any suitable liquid that will not vaporize at the temperatures and pressures encountered.

A panel 30 of insulating material is supported from the subframe 17 by four posts 31 and carries a fan switch 33, shown in Figures 2 and 5 and a limit switch 34, shown in Figure 3. Both switches are illustrated as being of the magnetic snap action type. The fan switch comprises a fixed contact 36 that is adjustably screw-threaded in a terminal strip 37 that is suitably secured to the panel 30. A movable contact 38 is secured to the end of a spring strip 39 which also carries an armature 40. The armature 40 cooperates with a permanent magnet 41 attached to the panel 30 to provide snap action of the contact between open and closed position. The spring strip 39 is carried by a terminal strip 43 also suitably secured to the panel 30. An adjusting screw 44 positions the fixed end of the strip 39 so that the resilience thereof will separate the contacts in opposition to the attraction of the magnet 41.

The limit switch 34 is similar to the fan switch 33 with the exception that it is a normally closed switch. A fixed contact 46 is carried by a bracket 47 which may be formed as an extension of a terminal strip 48 that is suitably attached to the panel 30. A movable contact 50 is secured to the end of a spring strip 51 which in turn is attached to the panel 30 by a terminal strip 53. An adjusting screw 54 positions the upper end of the spring strip 51 so that an armature 55 on the strip 51 will normally be attracted to a magnet 56 that is secured to an extension of the portion 47 of the terminal strip 48 that carries the fixed contacts 46.

A bracket 57 supported on the under side of the subframe 17 carries a main lever 58 which is attached thereto by means of a thin spring strip 59 having portions riveted to each of these two members. The main lever 58 is thus pivoted on a horizontal axis extending transversely on the instrument frame and at right angles to the direction of movement of the bellows 25 due to temperature change. A U-shaped bracket 60 extends outwardly from the subframe 17 and carries one end of a tension spring 62 that extends between the main lever 58 and an adjusting screw and nut 63 supported in the bracket 60. The spring 62 biases the main lever 58 away from the bellows 25 and toward the front of the instrument. A post 65 is secured to the inner end of the bellows 25. A screw 67 is adjustable in the post 65 and is provided with a head 68 (as seen in Figure 4) which cooperates with a collar-like member 69 carried by the main lever 58. The cooperating surfaces of the head 68 of the screw 67 and the collar 69 are preferably spherical to permit a limited amount of universal movement therebetween. The spring 62 biases the lever 58 in a direction to place the screw 67 and the post 65 in tension, tending to increase the volume of the body of liquid 27 in the temperature sensing element. It will be noted that a one-way connection is thus provided between the bellows 25 and the main lever which may serve as a strain release to prevent injury to the limit switch as will be described hereinafter.

The fan switch 33 is actuated by a thrust member 71, of insulating material, extending between the spring strip 39 and the lower end of a floating lever 73. A spring strip 74 which is U-shaped as viewed in Figure 1 is riveted to both the floating lever 73 and the main lever 58 to provide a pivotal connection therebetween at the upper end of the main lever 58. A coil compression spring 76 acts between the frame 10 and the lower end of the floating lever 73 in line with the thrust member 71, and is of sufficient strength to close the switch 33 against the bias of the spring strip 39. An adjusting lever 77, which is pivoted on a bracket 78 carried by the frame 10, cooperates with suitable indicia on the upper extension of the subframe 17 to indicate the temperature at which the fan switch will be actuated to off position as the temperature is reduced. The lever 77 is provided with an extension 79 that is adapted to engage the underside of the upper end of the floating lever 74 as shown in Figures 1 and 2, and in somewhat enlarged form in Figures 5 and 8. It will be seen that as the main lever 58 is rotated clockwise by reduction in temperature, as viewed in Figures 2 and 5, that portion 79 of the adjusting lever 77 will engage the floating lever to cause counterclockwise rotation thereof about the upper end of the main lever 58 to compress the spring 76 and permit the bias of the spring strip 39 to open switch contacts.

Another adjusting lever 80, also pivoted in the bracket 78, determines the temperature at which the fan switch 33 will be actuated to closed position. This lever is provided with an extension 81 that is adapted to engage the underside of a spring strip 82 that is riveted at its lower end to the floating lever 73 and is formed so that its upper end is biased against the upper end of the floating lever 73. The spring strip 82 is provided with sufficient bias so that when it is separated from the lever 73 by extension 81 of the adjusting lever 80 it will exert a force on the lever 73 tending to rotate it in a counterclockwise direction about the upper end of the main lever 58 to produce a force at the lower end thereof in opposition to the force of the spring 76. Under this condition, shown in Figure 5, the net force transmitted through the thrust member 71 to the spring strip 39 is intermediate the force necessary to close the switch against the bias of the spring strip 39 as reduced by the pull of magnet 41 on armature 40 and the force necessary to permit the spring strip 39 to open the switch against the somewhat greater pull of the magnet 41 on armature 40 since the magnetic gap is somewhat smaller. Hence, the switch will remain in either open or closed position.

As the temperature rises the main lever 58 will be rotated counterclockwise from the position shown in Figure 2. The floating lever will leave the extension 79 of the adjusting lever 77 but the bias of the spring strip 82 will maintain the fan switch 33 in open position as described above. When the upper end of the floating lever 73 engages the spring strip 82, at a temperature determined by the setting of the adjusting lever 80, the bias of the spring strip 82 tending to rotate the lever in a counterclockwise direction about the upper end of the main lever 58 to oppose the spring 76 is removed and the spring 76 will close the switch. It will be noted that the spring strip actually engages a portion of the spring hinge strip 74 that connects the floating lever 73 to the main lever 58, but this portion of the strip 74 is rigidly attached to the floating lever and may be considered an integral part thereof. If the temperature then is reduced the extension 81 of the lever 80 will engage the spring strip 82 and again place a counterclockwise bias on the floating lever 73 opposing the spring 76, but this bias will be insufficient to cause opening of the switch 33 since the magnet 41 is now exerting a somewhat larger force on the armature 40 tending to keep the contacts in closed position. To open the switch the main lever 58 must be moved to a position in which the upper end of the floating lever 73 engages the extension 79 of the lever 77 to overcome the force of the spring 76 and permit the switch to open. Thus it will be seen that adjustment of the levers 77 and 80 determines the temperatures at which the fan switch 33 will be opened and closed.

The limit switch 34 is actuated by the mechanism illustrated in Figure 3. A lever 85 is pivotally connected to the upper end of the main lever 58 by a spring hinge strip 86 that is riveted to both the lever 85 and to the main lever 58. The lever 85 is provided with a spring strip 87 which is biased away from the upper end thereof and which is adapted to engage an extension 89 on a temperature adjusting lever 90. The lever 90 is pivoted on a bracket 91 mounted on the frame 10 and its outer end extends through the scale plate formed by the upper part of the subframe 17 and cooperates with suitable indicia thereon. The head of a screw 93 limits the amount of separation between the spring strip 87 and the floating lever 85. A thrust member 95 of insulating material extends between the lower end of the lever 85 and the spring strip 51 which carries the movable contact 50 of the limit switch 34. As the temperature increases from the position illustrated in Figure 3, the main lever 58 will move in a clockwise direction and the spring strip 87 will be compressed tending to rotate the floating lever 85 in a counterclockwise direction. The magnet 56 holds the armature 55 to maintain the contacts closed and exerts a sufficiently strong force to prevent the bias supplied by the spring strip 87 from opening the contact. However, on sufficient increase in temperature the spring strip 87 will engage the floating lever 85 and sufficient force will be applied through the thrust member 95 to overcome the magnetic attraction and to move the contacts to open position. If the temperature is reduced to separate the spring strip 87 from the lever 85 the spring strip will still exert sufficient bias on the lever 85 in a counterclockwise direction to maintain the contacts in open position since the attractive force of the magnet 56 on the armature 55 is now considerably reduced. On sufficient reduction in temperature the spring strip 87 will engage the head of the screw 93 removing the counterclockwise bias on the floating lever 85, and the magnet 56 will be effective to close the switch 34. Thus the screw 93 provides for adjustment of the operating differential of the limit switch 34. A light spring 96 is provided acting between the frame 10 and the floating lever 85 in a direction to prevent separation of the thrust member 95 from the floating lever 85 and from the spring strip 51 of the switch 34 when the spring strip 87 is out of engagement with extension 79 of the adjusting lever 90. Allowance for the force of the spring 96 is made by proper adjustment of the screw 54 which adjusts the downward force of the spring strip 51.

Should the temperature of the sensing element continue to rise for any reason after the limit switch is actuated to open position, then the floating lever 85 will be constrained from further movement by the extension 89 of the adjusting lever 90 and by the connection 95 to the blade 51 of the limit switch 34, or by a stop interposed at some suitable point in the linkage. When further outward movement of the main lever is impossible, the one way connection between the bellows 25 and the main lever provided by the head 68 of the screw 67 and the collar 69 acts as a strain release to prevent injury to the limit switch or to the lever system.

In order that adjustment of the fan switch shall have no effect on the control point of the limit switch, it is desirable that the two switch operating mechanisms be entirely independent of one another. This desirable feature is provided by the design in which the extensions 79 and 81 of the fan adjusting levers 77 and 80 act on the same side of the floating lever 73. If the temperature rises past the point at which the fan switch is actuated to closed position the floating lever 73 and the spring strip 82 associated therewith are entirely free of these adjusting levers and they can have no further influence on the position of lever 58 so that the position of lever 58 is determined only by the volume of the temperature responsive liquid 27.

The instrument is calibrated in the following manner: The screw 67 is adjusted in the post 65 to adjust the length of the connection between the bellows 25 and the main lever 58 so that the fan switch will be actuated to closed position at the temperature setting of adjusting lever 80. An eccentric adjustment 98 is provided between the adjusting lever 77 and its extension 79 to adjust the mechanism so that the fan switch will be opened at the temperature setting of the lever 77. Similarly an eccentric adjustment 99 is provided between the limit switch adjusting lever 90 an its extension 89 to adjust the mechanism so that the limit switch will be opened at the temperature setting of the lever 90.

If for any reason a leak should occur in the tube 23, chamber 20, or in the bellows 25, the main lever 58 will be moved in a counterclockwise direction, as seen in Figure 2, under the influence of the tension spring 62 which is adjusted by screw and nut 63 to provide sufficient bias on the main lever 58 to assume opening of the limit switch 34. If the temperature is sufficiently low when this rupture occurs the first effect will be to actuate the fan switch to closed position and on further movement to actuate the limit switch to open position. If this device is used in a forced warm air heating system it will be seen that safe operation is assured. Operation of the fan will tend to reduce the temperature in the furnace bonnet and opening of the limit switch will cut off the supply of heat. Likewise if the fan should fail to operate for any reason, tending to cause overheating in the furnace, the limit switch will be opened to stop operation of the burner.

Figure 6 shows a portion of the limit switch operating mechanism modified to eliminate the tension spring 62, which in the above described structure serves to bias the main lever 58 to place the post 65 and screw 67 in tension and thereby bias the bellows 25 in a direction tending to collapse the bellows and to increase the volume of the temperature sensitive liquid 27 in the chamber formed by the tube 23, container 20 and bellows 25. In the present modification the bellows 25 is selected to have such normal or unstressed shape and have the necessary resilience so that it is capable of moving the limit switch to open position at the highest possible setting of the adjusting lever 90. In order to accomplish this function it is necessary that the screw 67 be capable of exerting an outward force on the main lever 58. A nut 101 threaded to the screw 67 may serve as an abutment for a compression spring 102 to bias the main lever 58 to maintain the lever 58 in engagement with the collar 69 and the collar 69 in engagement with the head of the screw 67. In normal operation atmospheric pressure acting on the interior of the bellows 25 maintains the bellows in a position determined by the volume of the body of temperature sensitive liquid contained within the sensing element. However, if a leak should occur in the chamber permitting air to enter, then the pressures on opposite sides of the bellows 25 will be equalized and the resilience of the bellows will move the mechanism to actuate the fan and limit switches to safe positions. This modification has the disadvantage over the structure of Figures 1 through 4 that certain types of failure of the bellows itself might render it incapable of moving the limit switch to open position. Thus, the bellows 25 might lose its resilience or fail by fatigue after long continued use.

Another modification is illustrated in connection with the fan switch mechanism in Figure 7. Here a weight 104 biases the main lever 58 in a counterclockwise direction and serves the same purpose as the tension spring 62 of the first described structure. The weight 104 is connected to the lever 58 by a metal tape 105 which passes over a pulley 106 supported by the subframe 17. Should the chamber containing the expansible liquid be ruptured, the weight 104 will move the lever 58 to actuate both the fan and limit switches to safe positions.

The scope of my invention is defined by the following claims.

I claim as my invention:

1. In a control device, a condition responsive element, a main lever positioned by said element, a first auxiliary lever pivoted to said main lever, an adjustable abutment for engaging a portion of said first auxiliary lever, a switch having a one way connection with and adapted to be actuated by another portion of said first auxiliary lever at a condition value depending on the setting of said adjustable abutment, a second auxiliary lever pivoted to said main lever, an adjustable abutment for engaging a portion of said second auxiliary lever, and a switch having a one way connection with and adapted to be actuated by another portion of said second auxiliary lever at a condition value depending on the setting of the adjustable abutment for said second auxiliary lever.

2. In a control device, a switch operable to one position on application of a predetermined force and operable to another position on application of a different force, a condition responsive element, a member positioned by said element in accordance with condition value, a lever pivoted to said member and having another portion operatively connected to said switch, first adjustable abutment means adapted to engage a third portion of said lever to act as a fulcrum for said lever to enable said condition responsive element to actuate said switch to one of its operative positions, second adjustable abutment means, and a resilient connection between said second abutment means and said lever, said resilient connection biasing said lever with a force effective on said switch intermediate the values required to actuate said switch to said two operative positions.

3. In a control device, a switch operable to one position on application of a predetermined force and operable to another position on application of a different force, a condition responsive element, a member positioned by said element in accordance with condition value, a lever pivoted to said member and having another portion operatively connected to said switch, first adjustable means adapted to engage a third portion of said lever to cause said switch to move to one of its operative positions at a selected condition value, second adjustable means cooperating with said lever to determine the condition value at which said switch is actuated to its other operative position, said second adjustable means tending to cause rotation of said lever with respect to said member in the same direction as said first adjustable means, and resilient means acting between said second adjustable means and said lever at condition values intermediate the settings of said two adjustable means, said resilient means biasing said lever with a force effective on said switch intermediate the values required to actuate said switch to said two operative positions.

4. In a control device, a switch operable to one position on application of a predetermined force and operable to another position on application of a different force, a condition responsive element, a member positioned by said element in accordance with condition value, a lever pivoted to said member and having another portion operatively connected to said switch, an adjustable abutment adapted to cooperate with a third portion of said lever to determine the condition value at which said switch is actuated to one of its operative positions, resilient means acting between said abutment and said lever, and means limiting the amount of relative movement of said lever and said abutment through which said resilient means is effective, said resilient means biasing said lever in a direction to actuate said switch with a force effective on said switch intermediate the values required to actuate said switch to said two operative positions.

5. In a control device, a condition responsive element, a member positioned by said element, a pair of floating levers pivoted to said member, a pair of snap switches each operable to one position on application of a predetermined force and operable to another position on application of a different force and each actuated by one of said levers by a portion thereof removed from its pivot in said member, a pair of adjustable abutments each of which is adapted to cooperate with a third portion of one of said levers, one of said abutments engaging the corresponding lever at relatively low values of the condition and the other of said abutments engaging the other lever at relatively high values of the condition, resilient means acting between cooperating abutments and levers, and means limiting the amount of relative movement of said cooperating abutments and levers through which said resilient means are effective, said resilient means biasing each of said levers in a direction to actuate each of said corresponding switches with a force intermediate the values required to actuate said switch to its two operative positions.

6. In a control device, a switch operable to one position on application of a predetermined force and operable to another position on application of a different force, a condition responsive element, a member positioned by said element in accordance with condition value, a lever pivoted to said member and having another portion operatively connected to said switch, first adjustable means adapted to engage a third portion of said lever to cause said switch to move to one of its operative positions at a selected condition value, second adjustable means cooperating with said lever to determine the condition value at which said switch is actuated to its other operative position, said second adjustable means tending to cause rotation of said lever with respect to said member in the same direction as said first adjustable means, resilient means acting between said second adjustable means and said lever at condition values intermediate the settings of said two adjustable means, said resilient means biasing said lever with a force effective on said switch intermediate the values required to actuate said switch to said two operative positions, a second switch, and connecting means between said member and said second switch, said connecting means being arranged to actuate said second switch at a condition value such that said lever is out of cooperative engagement with both said first and second adjustable means.

7. In a control device, a switch operable to one position on application of a predetermined force and operable to another position on application of a different force, a condition responsive element, a member positioned by said element in accordance with condition value, a lever pivoted to said member and having another portion operatively connected to said switch, first adjustable abutment means adapted to engage a third portion of said lever to act as a fulcrum for said lever to enable said condition responsive element to actuate said switch to one of its operative positions, second adjustable abutment means, resilient means biasing said lever with a force effective on said switch intermediate the values required to actuate said switch to said two operative posiitons, said second adjustable stop controlling application of the force of said resilient means on said switch.

8. In a control device, an actuating member, condition responsive means for positioning said member, a first actuated lever one portion of which is positioned by said member, control means actuated between two operative positions by a second portion of said lever, a pair of adjustable stops adapted to engage a third portion of said lever to determine the value of the condition at which said control means is actuated to each of its operative positions, a second lever one portion of which is positioned by said member, second control means actuated by a second portion of said second lever, and an adjustable stop adapted to engage a third portion of said second lever to determine the value of the condition at which said second control means is actuated.

9. In a control device, an actuating member, a condition responsive element for positioning said member, a first lever one portion of which is pivoted to said member, control means actuated by a second portion of said lever, an adjustable stop adapted to engage a third portion of said lever on a fall in condition value to cause actuation of said control means at a selected relatively low condition value, a second lever one portion of which is pivoted to said member, second control means actuated by a second portion of said second lever, and a second adjustable stop adapted to engage a third portion of said second lever on a rise in condition value to cause actuation of said second control means at a selected higher condition value.

10. In a control device, an actuating member, a condition responsive element for positioning said member, a first lever one portion of which is pivoted to said member, a control means actuated by a second portion of said lever, said lever having a one way connection with said control means, an adjustable stop adapted to engage a third portion of said lever on a fall in condition value to cause actuation of said control means at a selected relatively low condition value, a second lever one portion of which is pivoted to said member, second control means actuated by a second portion of said second lever, said second lever having a one way connection with said second control means, and a second adjustable stop adapted to engage a third portion of said second lever on a rise in condition value to cause actuation of said second control means at a selected higher condition value.

11. In a control device, an actuating member, condition responsive means for positioning said member a plurality of floating levers each pivoted to said actuating member, separate control means each actuated by one of said floating levers, and separate stops adapted to engage separately each of said floating levers to cause actuation of each of said control means at condition values determined by the position of said stops.

12. In a control device, an actuating lever, condition responsive means for positioning said lever, a plurality of floating levers each pivoted to said actuating lever, separate control means each actuated by one of said floating levers, and separate stops adapted to engage separately each of said floating levers to cause actuation of each of said control means at a predetermined condition value, one of said stops being adjustable.

13. In a control device, a condition responsive element, a member positioned by said element, a plurality of levers each pivoted to said member, adjustable abutments each adapted to engage separately a portion of one lever remote from its pivotal connection to said member, and separate switching means actuated by another portion of each of said levers at values of the condition depending upon the adjusted position of the individual abutments.

JOSEPH O. THORSHEIM.

REFERENCES CITED

The following references are of record in the file of this patent:

UNITED STATES PATENTS

| Number | Name | Date |
|---|---|---|
| 1,109,996 | Kuhlmann | Sept. 8, 1914 |
| 1,719,959 | Bast | July 9, 1929 |
| 1,786,083 | Penn | Dec. 23, 1930 |
| 1,820,035 | Stokes | Aug. 25, 1931 |
| 2,125,627 | Fonseca | Aug. 2, 1938 |
| 2,187,258 | Wood | Jan. 16, 1940 |
| 2,280,959 | Kronmiller | Apr. 28, 1942 |
| 2,291,501 | Persons | July 28, 1942 |
| 2,298,795 | Judson | Oct. 13, 1942 |
| 2,448,273 | Pearce | Aug. 31, 1948 |